US011984632B2

(12) United States Patent
Johnson

(10) Patent No.: US 11,984,632 B2
(45) Date of Patent: May 14, 2024

(54) MICROWAVE PULSE POWER SWITCHING SYSTEM FOR REFLECTIVE AND RESONANT LOADS

(71) Applicant: Ray M. Johnson, Shady Cove, OR (US)

(72) Inventor: Ray M. Johnson, Shady Cove, OR (US)

( * ) Notice: Subject to any disclaimer, the term of this patent is extended or adjusted under 35 U.S.C. 154(b) by 400 days.

(21) Appl. No.: 17/508,928

(22) Filed: Oct. 22, 2021

(65) Prior Publication Data

US 2022/0131245 A1 Apr. 28, 2022

Related U.S. Application Data

(60) Provisional application No. 63/105,123, filed on Oct. 23, 2020.

(51) Int. Cl.
*H01P 1/12* (2006.01)
*H01P 1/11* (2006.01)

(52) U.S. Cl.
CPC ................ *H01P 1/122* (2013.01); *H01P 1/11* (2013.01)

(58) Field of Classification Search
CPC .................................. H01P 1/10; H01P 1/122
USPC ......................... 333/258, 259, 262, 245, 248
See application file for complete search history.

(56) References Cited

U.S. PATENT DOCUMENTS

| | | | | |
|---|---|---|---|---|
| 6,407,646 B1 | 6/2002 | Johnson | | |
| 7,551,042 B1 | 6/2009 | Johnson | | |
| 8,878,623 B2 * | 11/2014 | Kroening | ................. | H01P 1/10 333/1.1 |
| 8,941,447 B2 | 1/2015 | Johnson | | |

* cited by examiner

*Primary Examiner* — Rakesh B Patel
(74) *Attorney, Agent, or Firm* — Beeson Skinner Beverly, LLP

(57) ABSTRACT

A microwave pulse power switching system comprised of a pulse power switcher and a microwave circulator is interposable between a pulse power source and a pulse power receiver such as an accelerator. The pulse power switcher and microwave circulator are configured to allow switching of the pulse power delivered to the pulse power receiver while isolating the pulse power receiver from the pulse power source.

18 Claims, 3 Drawing Sheets

MICROWAVE PULSE POWER SWITCHING SYSTEM FOR REFLECTIVE AND RESONANT LOADS

CROSS-REFERENCE TO RELATED APPLICATIONS

This application claims the benefit of U.S. Provisional Application No. 63/105,123 filed Oct. 23, 2020, which is incorporated herein by reference.

BACKGROUND

The present invention generally relates to high power waveguide systems, and more particularly to waveguide systems for delivering microwave pulse power to a load from a microwave pulse power source. The invention is directed to the effective use of pulse power switchers in such systems where the load is a reflective or resonant load.

High power microwave pulses are used in a range of industrial applications, such as in radiation oncology, radar systems, cargo scanning and scientific research and testing. Such energy pulses are typically produced by self-excited oscillators such as magnetrons, which produce short pulses of high power microwave energy in response to very short pulses of applied voltage, where the amplitude of the voltage pulses applied to the magnetron determine the magnitude of the output pulses from the magnetron. If they are constant from pulse-to-pulse, the magnetron will deliver output pulses of high energy microwave power that are stable and well behaved. However, if there are variations in the applied voltage pulses, the output pulses from the magnetron will degrade the performance of the magnetron in a particular application. As a result, the use of magnetrons is problematic in applications where it is desired to vary the magnitude of the pulse power delivered to a load, such as alternating between a pulse at full peak power to a pulse of attenuated power, e.g. one-half power (or less). Altering the applied voltage to the magnetron to achieve this end would result in unacceptable frequency drift in the pulse power received by the load.

One solution to overcoming this problem is offered in U.S. Pat. No. 8,941,447 to Ray M. Johnson ("Johnson '447 Patent"). The Johnson '447 patent discloses a microwave pulse power switching system that receives high power microwave pulses from a self-excited oscillator such as a magnetron at constant magnitude and provides for switching the full power pulses between different pulse power levels such that pulses of different power levels can be delivered to a load without having to vary the voltage pulses applied to the magnetron. With the pulse power switching system disclosed in the Johnson '447 patent, pulse power switching is achieved separately from and downstream of the magnetron to avoid having to deal with the problems associated with altering the magnetron's inputs.

While use of a pulse power switching system such as disclosed in the Johnson '447 patent has significant advantages, it also has a drawback. It generally works well with non-reflective/non-resonant loads, such as travelling wave accelerators, but does not behave well with reflective or resonant loads, such as standing wave accelerators. This is because in reflective loads a portion of the power reflects back through the switching system and causes instabilities in the magnetron that degrade its performance. In resonant loads the magnetron tends to destabilize at the front and back edges of a pulse when filling and dumping of energy from the energy storing load occurs.

The present invention overcomes stability problems associated with pulse power switching systems where the pulse power is delivered to reflective or resonant loads. The invention will permit pulse power switchers to be used effectively in applications where the pulse power is supplied by any microwave pulse power source and will expand the applications for pulse power delivery systems. While the invention is particularly adapted to resolving the above-mentioned stability problems associated with self-excited oscillators, the invention is not limited to this application. It can also be employed in applications involving other pulse power sources, such as klystrons and solid state pulse power sources, where it is desired to control microwave power that is reflected by a reflective load to which the pulse power is being delivered.

SUMMARY OF INVENTION

The present invention is directed to a microwave pulse power switching system that is interposable between a pulse power source and a pulse power receiver which uses the pulse power for some useful purpose, for example, for accelerating particle beams in a standing wave accelerator. The pulse power switching system is comprised of two essential components, a pulse power switcher and a microwave circulator or isolator. (An isolator is simply the combination of a circulator with a load.) The pulse power switcher is configured such that all or a portion of the power of individual pulses within a series of microwave pulses entering the switcher's pulse power input port can be switchably diverted through a forward wave pulse power diversion port of the switcher to a load attached to the port, which is suitably but does not need to be a power dissipating load.

By switching all or a portion of the pulse power entering the pulse power switcher to the forward wave pulse power diversion port of the switcher, the energy in each of the microwave pulses exiting the output port of the pulse power switcher can be controlled. For example, if all the pulse power entering the switcher through its pulse power input port is diverted into the switcher's forward wave pulse power diversion port, no pulse power would exit the switcher's pulse power output port. If half of the pulse power entering the switcher through its pulse power input port is diverted into the switcher's forward wave pulse power diversion port, then the pulse power exiting the switcher's pulse power output port would be reduced by half of that entering the switcher. If, on the other hand, none of the pulse power entering the switcher through its pulse power input port is diverted into the switcher's forward wave pulse power diversion port, all of the pulse power entering the switcher would exit the switcher's pulse power output port and would be available for its intended purpose.

The second essential component of the microwave pulse power switching system of the invention is a waveguide circulator having a pulse power input port, a pulse power output port, and a diversion port configured to divert microwave power returned by the pulse power receiver to a load, which also could suitably be but does not need to be a power dissipating load. The pulse power switcher and waveguide circulator are connected in series such that the pulse power switcher controls the amount of microwave power within each microwave pulse of the series of microwave pulses passing through the switcher that is delivered to the pulse power receiver, and such that the waveguide circulator receives and diverts microwave power returned by a pulse power receiver into a load, which is suitably a load separate from the load used by the switcher to dump switched out pulse power. The circulator prevents substantially all microwave power returned by the pulse power receiver from arriving at the pulse power source that is being delivered to the pulse power receiver.

In one aspect of the invention, the pulse power switcher of the system is a 3-port pulse power switcher for switchably diverting forward wave pulse power only. In this aspect of the invention, the system's waveguide circulator is preferably connected in series with the 3-port pulse power switcher between the pulse power switcher and the pulse power receiver wherein microwave power returned by the pulse power receiver is diverted to a load before reaching the pulse power switcher.

In another aspect of the invention, the pulse power switcher is a 4-port pulse power switcher for both switchably diverting forward wave pulse power to a load and diverting microwave power returned by the pulse power receiver to another load. In this aspect of the invention, the waveguide circulator is connected in series with the 4-port pulse power switcher between the pulse power switcher and the pulse power source. In this configuration, at least some of the microwave power returned by the pulse power receiver is first diverted to a load by the pulse power switcher before reaching the waveguide circulator. Any portion of the returned microwave power that is not diverted and dumped into a load by the 4-port pulse power switcher is diverted to a load by the upstream waveguide circulator.

Further aspects of the invention will be apparent to a person of ordinary skill in the art from the following description and accompanying drawings.

DETAILED DESCRIPTION OF ILLUSTRATED EMBODIMENTS

Figure 1:
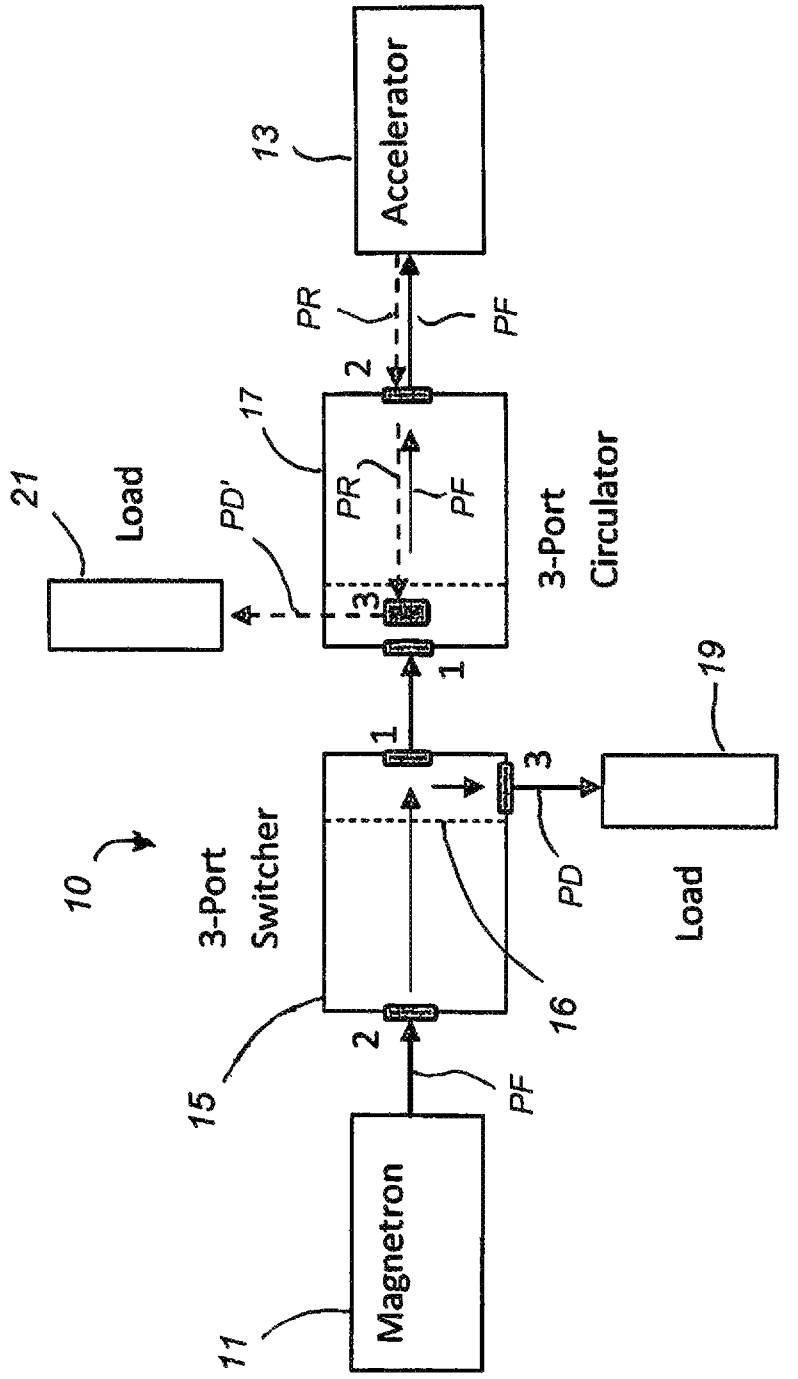
FIG. 1 is a graphical representation of a microwave pulse power switching system in accordance with the invention based on a 3-port pulse power switcher.

Referring now to the drawings, FIG. 1 graphically illustrates a version of a waveguide microwave pulse power switching system in accordance with the invention wherein the switching system, denoted by the numeral 10, is interposed between a magnetron 11, which is a self-excited oscillator that provides a source of high power microwave pulses, and a pulse power receiver, which in the illustrated embodiment is shown as an accelerator 13 which uses the pulse power to accelerate a particle beam in the accelerator waveguide. (It is noted that a "receiver" can also be referred to as a "load.") Using the switching system of the invention as hereinafter described, the pulse power can be adjusted up or down between full available power and greatly diminished power to meet different requirements. Depending on the application, the magnitude of the pulse power can be adjusted up or down for all the pulses in a series of pulses or the magnitudes can be varied from pulse to pulse. For example, in cancer treatments, the pulse power for all pulses can be adjusted up or down to control penetration depths of the radiation produced by the accelerator in accordance with the depth of a tumor, thereby providing the capability to optimize the efficacy of treatments for different body sizes and tumor locations. In other applications, the magnitudes of the pulses can be varied from pulse to pulse. For example, for cargo scanning, pulse magnitudes can be varied to allow the scanner to detect different types of cargo based on the different signature responses of the irradiated cargos.

The pulse power switching system 10 is seen to be comprised of two essential components, namely, a pulse power switcher 15, which in the FIG. 1 embodiment is a 3-port switcher, and a microwave circulator 17. (As noted above, a circulator with a load is often referred to as an "isolator." As used herein, references to "circulator" are intended to include isolators where the load, denoted by the numeral 19 in FIG. 1, is included.) The 3-port switcher 15 and circulator 17 are connected in series, with the switcher being upstream of the circulator, that is, between the circulator and the magnetron which supplies the microwave pulse power needed to operate the accelerator. In the later described system shown in FIG. 2, this switcher and circulator order is reversed, with the switcher being downstream of the circulator, that is, between the circulator and the accelerator.

It is noted that naming convention for the ports used in this specification follows a conventional naming convention for the ports of a switcher and circulator. References to port numbers in this specification are preceded by the word "Port," for example, "Port 1," whereas in FIGS. 1 and 2 only the applicable port numbers are used. The port numbers are shown next to shaded rectangles representing the ports, with the wider rectangles representing ports that face out of the drawing page and the narrower rectangles representing ports facing in a direction parallel to the drawing page. The direction of the pulse power represented by power flow arrows emanating from ports facing out of the page would be perpendicular to the drawing page.

The 3-port pulse power switcher 15 shown in FIG. 1 is suitably a 3-port switcher configured such that all or a portion of the power of individual pulses can be switchably diverted and thus not passed through to accelerator 13. Specifically, switcher 15 is comprised of a pulse power input port, Port 2, which is shown as receiving the pulse power output of the magnetron, a forward wave pulse power diversion port, Port 3, through which switched-out pulse power can be diverted to load 19, and a pulse power output port, Port 1, through which pulse power that has not been diverted to load 19 can be delivered to the accelerator. In the case of the FIG. 1 embodiment, the pulse power output from switcher 15 is passed on to the accelerator through circulator 17. The power level of the pulses received by the circulator is determined by the switcher.

The circulator component of the system shown in FIG. 1 is a 3-port circulator 17 having a pulse power input port, Port 1, connected to the output port, Port 1, of switcher 15, a pulse power output port, Port 2, for delivering power received from the switcher to the accelerator 13, and a return microwave diversion port, Port 3, for diverting microwave power returned by the accelerator 13 to load 21, which, as mentioned, is suitably a load. Positioned as shown in FIG. 1, circulator 17 will prevent microwave power returned by the accelerator from being passed back through the switcher to the magnetron, thereby isolating the magnetron from the accelerator. It is noted that this returned power could be reflected power that results from load mismatches at the accelerator input, or power returned at the leading edge of each pulse during the fill time for the accelerator waveguide or at the back end of the pulse as the accelerator guide dumps power in absence of an input.

The power flow within the pulse power switching system shown in FIG. 1 is illustrated by the power flow arrows where the solid line arrows PF and PD represent forward wave propagation through switching system 10 and the broken line arrows PR and PD' represent backward wave propagation through the switching system due to returned power from the accelerator. It can be seen from these power flow indications that forward wave propagation begins at the magnetron, which delivers pulse power to the input Port 2 switcher 15. The forward wave propagation continues through the switcher where the pulse power enters a switching end of the switcher. The beginning of the switching end of the switcher is denoted by a dashed divider line 16, and it is here that the pulse power can be switched such that all or a portion of the pulse power is diverted out through the switcher's pulse power diversion port, Port 3, to load 19. This power diversion is denoted by the solid arrow PD extending through Port 3 of the switcher. Whatever portion of the pulse power is not diverted exits the switcher through the switcher's output port, Port 1. From there the pulse power passes through the circulator 17 to the accelerator, as denoted by the solid line PF arrow extending through the circulator and the PF arrow emanating from Port 2 of the circulator. The microwave power returned by the accelerator is denoted by PR broken line arrows which show the returned power passing into and through the circulator in the return direction. As illustrated by broken line arrow PD', the circulator takes this returned power and diverts it through its diversion port (Port 3) where it is dumped into load 21. By capturing all the return power, the upstream magnetron is effectively isolated from the accelerator with respect to any power that may be returned by the accelerator during a pulse cycle. By diverting the returned power in this fashion, the stability of the magnetron during the operation of the switcher can be maintained.

Figure 2:
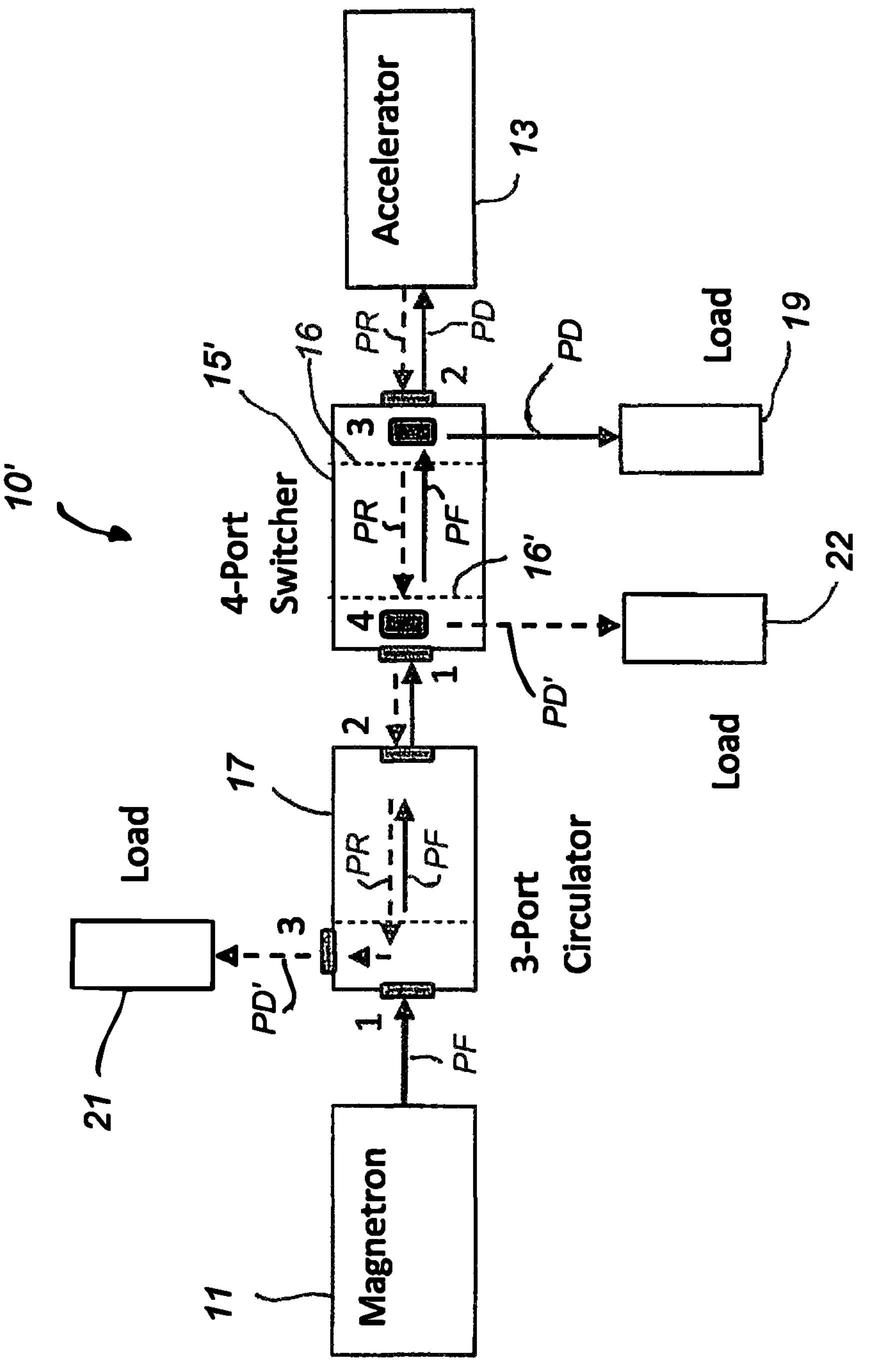
FIG. 2 is a graphical representation of a microwave pulse power switching system in accordance with the invention based on a 4-port pulse power switcher.

In the embodiment illustrated in FIG. 2, the switcher component of the switcher system, denoted 10', is a 4-port switcher 15' instead of a 3-port switcher as shown in FIG. 1. And as noted above, the order of the switcher and the isolating circulator are reversed. In addition, the orientation of both the switcher and the circulator are reversed, such that, with respect to the switcher, Port 1 becomes the switcher's pulse power input port and Port 2 becomes the switcher's pulse power output port, and with respect to the circulator, Port 1 is now the circulator's pulse power input port and Port 2 is its pulse power output port. The diversion port designations remain the same except that the switcher now has an added diversion port designated Port 4.

As shown in FIG. 2, the 4-port switcher provides for the diversion of both forward wave pulse power and the returned power. The diversion of forward wave pulse power, again denoted PF, occurs after the forward wave pulse power travels through circulator 17 and is introduced into the switcher through the switcher's input port, i.e., Port 1. From there, the forward wave pulse power continues to propagate through the switcher where the pulse power enters the far end of the switcher, the beginning of which is represented by dashed divider line 16. As in the FIG. 1 embodiment, it is here that the pulse power can be switched such that all or a portion of the pulse power is diverted through the switcher's pulse power diversion port, Port 3, to load 19 as denoted by the solid PD arrow that extends out from Port 3 of the switcher. Whatever portion of the pulse power is not diverted through this diversion port exits the switcher's output port (Port 2) where it is delivered to the accelerator as indicated by the solid PD arrow that extends from Port 2 of the switcher to the accelerator.

The paths of the power returned by the accelerator in the FIG. 2 configuration are again illustrated by broken line arrows PR and PD'. In this case, the returned power first travels through the switcher 15' where it can be divided so that at least a portion of the return power is diverted through Port 4 of the switcher to load 22. This happens within a section of the switcher which for illustrative purposes is represented by the region of the switcher to the left of dashed line 16'. The portion of the return power that is not diverted through Port 4 of the 4-port switcher exits the switcher through switcher's input port (Port 1). Upon exiting the switcher, this portion of the return power enters the circulator 17 through the circulator's output port (Port 2). The circulator then takes this remaining power and diverts it to load 21 through the circulator's third port (Port 3).

The pulse power switcher systems illustrated in FIGS. 1 and 2 achieve the same result, effectively isolating the magnetron power source from the microwave power returned from a reflective or resonant load, such as the standing wave accelerator. The 3-port switcher used in the FIG. 1 configuration can be implemented by the 3-port pulse power switcher illustrated in FIGS. 7-10 of the Johnson '447 patent, while the 4-port switcher used in the FIG. 2 configuration can be implemented by the 4-port pulse power switcher illustrated in FIGS. 14 and 15 of that same patent disclosure.

The configuration of the waveguide hardware that can be used to implement the switching system graphically illustrated in FIG. 1—that is, the configuration using a 3-port switcher in front of the circulator—is now described with reference to FIG. 3.

Figure 3:
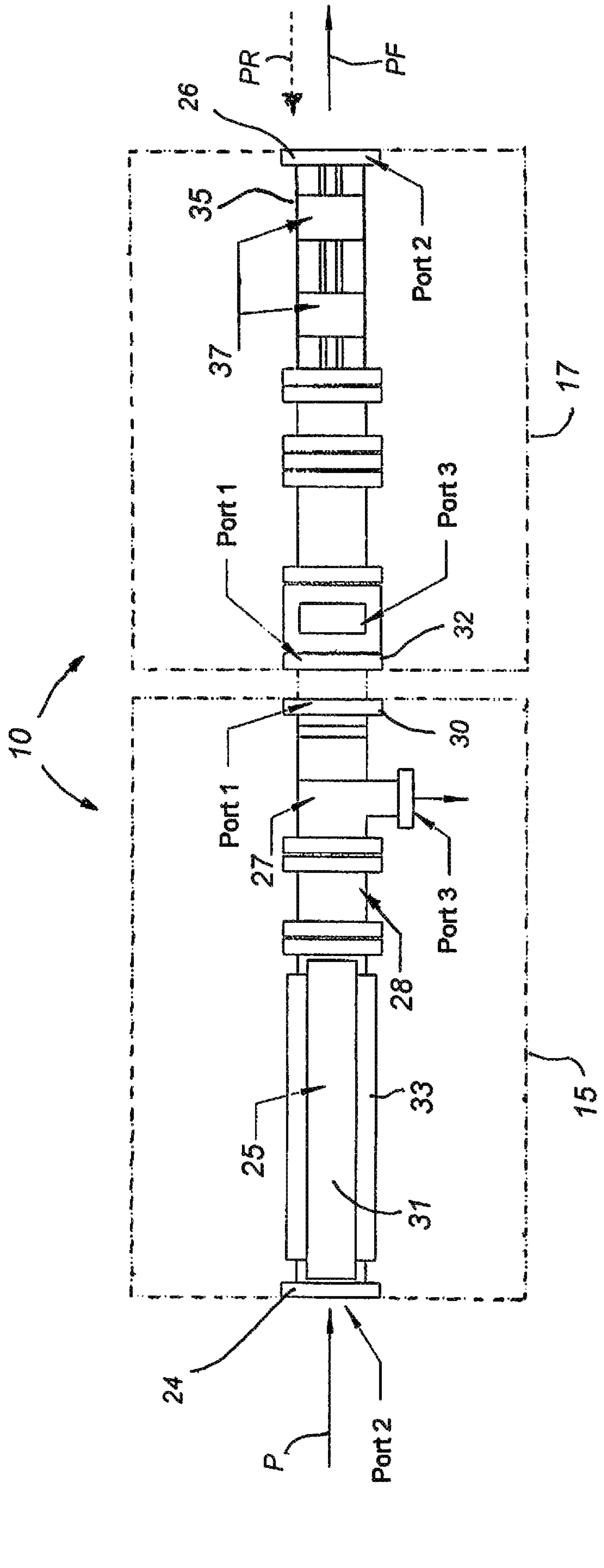
FIG. 3 is a top plan view of a waveguide configuration for a microwave pulse power switching system in accordance with the invention based on a 3-port pulse power switcher.

As shown in FIG. 3, the pulse power switcher component 15 of the illustrated switching system 10 includes a 2-port ferrite loaded bifurcated waveguide section 25, as described in the Johnson '447 patent, connected to an E-plane hybrid-T 27 ("folded-E hybrid") through a waveguide dual step transformer 28. The free end of the bifurcated waveguide section 25 is Port 2 of the switcher and receives pulse power from the magnetron (not shown in FIG. 3) as denoted by arrow P. Switching of the pulse power is accomplished by means of electromagnets 31 and their associated magnetic circuits 33 secured to the broadwalls of the bifurcated waveguide section. The structure of this bifurcated waveguide section is described in more detail in the Johnson '447 patent.

As seen in FIG. 3, Port 1 and Port 3 of the 3-port pulse power switcher are provided by two of the three ports of the folded-E hybrid 27, which sends microwave pulse power entering the Port 2 provided by the bifurcated waveguide section 25 to either or both Port 1 (the output port) or Port 3 (the diversion port) of the folded-E hybrid 28. How the pulse power divides between these two ports will be determined by the inputs to the electromagnet which change the magnetic fields produced in the reduced height waveguides of the bifurcated waveguide section 25.

The circulator component 17 of the pulse power switcher system can be constructed in accordance with U.S. Pat. No. 6,407,646 to Ray M. Johnson (Johnson '646 patent), which is incorporated herein by reference. Such is the case in the embodiment illustrated in FIG. 3, where the input waveguide port of the circulator (Port 1) is connected to the folded-E hybrid waveguide port forming Port 1 of the switcher 15 for receiving pulse power from the switcher. The pulse power from the switcher travels through circulator 17, including the ferrite loaded, bifurcated waveguide section 35 of the circulator, to a load such as an accelerator (not shown) as denoted by the solid arrow PF. The microwave power returned by the accelerator load (denoted by the PR arrow) is passed back through the ferrite loaded bifurcated waveguide section 35 and acted on by the magnetic fields produced by permanent magnets 37 on the waveguide broadwalls of this waveguide section. The magnetic fields produced by the magnets cause a phase shift in the returned power that forces the returned power out through the circulator's diversion waveguide port (Port 3). Thus, the circular 17 serves to isolate the upstream magnetron from the microwave power returned by the accelerator (not shown) or other reflective or resonant load.

It is seen that all of the waveguide parts of the switcher component 15 and circulator component 17 of the pulse power switching system 10 suitably have conventional waveguide flanges at their ends for internally connecting the waveguide parts together and for connecting the switcher component of the system to the circulator component and for connecting these components to external waveguides that feed pulse power to the system and that convey pulse power to the loads. These include flange 24 at Port 2 of the switcher component, which is the power feed end of the system, flange 26 at Port 2 of the circulator component, which is the power output end of the system, and flanges 30 and 32 at Port 1 of both the switcher and circulator, which are used to connect the switcher and circulator components together. (In FIG. 3 they are shown separated for illustrative purposes.)

It will be understood that the hardware configuration for the 4-port switcher embodiment of the switching system graphically illustrated in FIG. 2 would involve a substitution of the 3-port switcher such as shown in FIG. 3 with a 4-port switcher and the reversal of the order of the switcher and the circulator.

While different embodiments of the invention have been described in detail in the foregoing specification and accompanying drawings, it is not intended that the invention be limited to such detail, except as may be expressly provided in the following claims. For example, while in the described illustrated embodiment of the invention the pulse power source is identified as a self-excited oscillator such as a magnetron, it is not intended that the invention be limited to applications where self-excited microwave pulse power sources are used. Rather, it is contemplated that the invention will have utility in applications employing other types of pulse power sources, such as klystrons and solid state devices.

I claim:

1. A microwave pulse power switching system interposable between a pulse power source and a pulse power receiver which receives and uses pulse power produced by the pulse power source for a useful purpose, the system comprising:

a pulse power switcher having a pulse power switcher input port, a pulse power switcher output port and a forward wave pulse power diversion port, the pulse power switcher being configured such that all or a portion of the power of individual pulses within a series of microwave pulses entering the pulse power switcher input port of the pulse power switcher can be switchably diverted through the forward wave pulse power diversion port of the pulse power switcher to any load for controlling the power of the microwave pulses exiting the pulse power switcher output port, and a waveguide circulator having a circulator pulse power input port, a circulator pulse power circulator output port and a return microwave diversion port configured to divert microwave power returned by the pulse power receiver to any load, the pulse power switcher and waveguide circulator being connected in series such that the pulse power switcher controls the amount of microwave power within each microwave pulse of a series of microwave pulses that is delivered to the pulse power receiver through the series connected pulse power switcher and waveguide circulator, and wherein the waveguide circulator receives and diverts microwave power returned by a pulse power receiver to substantially prevent the returned microwave power from arriving at the pulse power source.

2. The microwave pulse power switching system of claim 1 wherein the pulse power switcher is a 3-port pulse power switcher for switchably diverting forward wave pulse power only.

3. The microwave pulse power switching system of claim 2 wherein the waveguide circulator is connected in series with the 3-port pulse power switcher between the pulse power switcher and the pulse power receiver, wherein microwave power returned by the pulse power receiver is diverted to any load before reaching the pulse power switcher.

4. The microwave pulse power switching system of claim 1 wherein the pulse power switcher is a 4-port pulse power switcher for switchably diverting forward wave pulse power to any load and diverting microwave power returned by the pulse power receiver to any load.

5. The microwave pulse power switching system of claim 4 wherein the waveguide circulator is connected in series with the 4-port pulse power switcher between the pulse power switcher and pulse power source wherein at least a portion of the microwave power returned by the pulse power receiver is diverted to any load by the 4-port pulse power switcher before reaching the waveguide circulator, and wherein the pulse power circulator diverts any portion of the microwave power returned by the pulse power receiver that is not diverted to any load by the pulse power switcher.

6. The microwave pulse power switching system of claim 1 wherein the waveguide circulator is a 3-port circulator.

7. A microwave pulse power switching system interposable between a pulse power source and a pulse power receiver which receives and uses pulse power produced by the pulse power source for a useful purpose, comprising:

a 3-port pulse power switcher having a pulse power switcher input port, a pulse power switcher output port, and a switcher forward wave pulse power diversion port, the pulse power switcher being configured such that all or a portion of the power of individual pulses within a series of microwave pulses entering the pulse power input port of the 3-port pulse power switcher can be switchably diverted through the forward wave pulse power diversion port of the pulse power switcher to any load for controlling of the microwave pulses exiting the pulse power output port of the pulse power switcher, and a 3-port waveguide circulator having a circulator pulse power input port, a circulator pulse power output port and a return microwave diversion port configured to divert microwave power returned by the pulse power receiver to any load, the waveguide circulator being connected to the pulse power switcher such that the microwave circulator is positioned between the pulse power switcher and the pulse power receiver such that the pulse power switcher controls the amount of microwave power within each microwave pulse of a series of microwave pulses that is delivered to the pulse power receiver through the connected pulse power switcher and pulse power circulator, and wherein the waveguide circulator receives and diverts microwave power returned by a pulse power receiver before the returned microwave power reaches the pulse power switcher.

8. A microwave pulse power switching system interposable between a pulse power source and a pulse power receiver which receives and uses pulse power produced by the pulse power source for a useful purpose, comprising:

a 4-port pulse power switcher having a pulse power switcher input port, a pulse power switcher output port, a switcher forward wave pulse power diversion port for switchably diverting forward wave pulse power to any load, and a switcher return power diversion port for diverting at least a portion of the microwave power returned by the pulse power receiver to any load, the pulse power switcher being configured such that all or a portion of the power of individual pulses within a series of microwave pulses entering the pulse power input port of the four-port pulse power switcher can be switchably diverted through the forward wave pulse power diversion port of the four-port pulse power switcher to any load for controlling the power of the microwave pulses exiting the pulse power output port of the pulse power switcher, and a 3-port waveguide circulator having a circulator pulse power input port, a circulator pulse power output port, and a circulator return microwave diversion port configured to divert microwave power returned by the pulse power receiver to any load, the waveguide circulator being connected to the pulse power switcher such that the microwave circulator is positioned between the pulse power switcher and the pulse power source such that the pulse power switcher controls the amount of microwave power within each microwave pulse of the series of microwave pulses that is delivered to the pulse power receiver through the connected pulse power switcher and pulse power circulator, and wherein the waveguide circulator receives and diverts microwave power returned by a pulse power receiver that is not diverted by the 4-port switcher through the return microwave diversion port thereof.

9. A microwave pulse power switching system interposable between a pulse power source and a pulse power receiver which receives and uses pulse power produced by the pulse power source for a useful purpose, comprising:

a pulse power switcher for switchably controlling the magnitude of the power in the pulses in a series of microwave pulses delivered to a pulse power receiver from the pulse power source, and an isolator connector in series with the pulse power switcher to isolate the pulse power source from the pulse power receiver with respect to microwave power returned by the pulse power receiver.

10. The microwave pulse power switching system of claim 9 wherein the pulse power switcher is a 3-port pulse power switcher connected to the isolator such that the isolator dissipates return power from the pulse power receiver before the return power reaches the pulse power switcher.

11. The microwave pulse power switching system of claim 9 wherein the pulse power switcher is a 4-port pulse power switcher connected to the isolator such that both the pulse power switcher and the isolator dissipate return power from the pulse power receiver.

12. The microwave pulse power switching system of claim 9 wherein the isolator is comprised of a 3-port circulator.

13. A method for isolating a pulse power source from a reflective load which receives and uses pulse power produced by the pulse power source for a useful purpose, comprised of passing pulse power generated by the pulse power source through a pulse power switcher and a waveguide circulator that are connected in series, the pulse power switcher and waveguide circulator being configured such that the amount of pulse power delivered to the pulse power receiver is controlled by the pulse power switcher and at least a portion of the pulse power reflected by the reflective load is diverted to any load by the waveguide circulator.

14. The method of claim 13 wherein substantially all the pulse power reflected by the reflective load is diverted to any load by the waveguide circulator of the configured pulse power switcher and a waveguide circulator.

15. The method of claim 13 wherein a portion of the pulse power reflected by the reflective load is first diverted to any load by the pulse power switcher and wherein the portion of the pulse power reflected by the reflective load that is not diverted by the pulse power switcher is diverted to any load by the waveguide circulator.

16. The method of claim 13 wherein the amount of pulse power that is not delivered to the pulse power receiver by the pulse power switcher is diverted to any load.

17. The method of claim 16 wherein the amount of pulse power that is not delivered to the pulse power receiver by the pulse power switcher is diverted to a load.

18. The method of claim 16 wherein both the amount of pulse power that is not delivered to the pulse power receiver by the pulse power switcher and the pulse power reflected by the reflective load are diverted to power dissipating loads.

* * * * *